(12) United States Patent
Cano et al.

(10) Patent No.: US 9,333,560 B2
(45) Date of Patent: May 10, 2016

(54) MACHINE FOR MACHINING CRANKSHAFTS

(71) Applicant: ETXE-TAR, S.A., Elgoibar (Guipuzcoa) (ES)

(72) Inventors: Ernesto Cano, Guipuzcoa (ES); Gabriel Moya, Guipuzcoa (ES)

(73) Assignee: ETXE-TAR, S.A., Elgoibar (Guipuzcoa) (ES)

( * ) Notice: Subject to any disclaimer, the term of this patent is extended or adjusted under 35 U.S.C. 154(b) by 0 days.

(21) Appl. No.: 14/283,000

(22) Filed: May 20, 2014

(65) Prior Publication Data

US 2014/0345429 A1    Nov. 27, 2014

(30) Foreign Application Priority Data

May 24, 2013    (EP) ..................... 13382190

(51) Int. Cl.
| | |
|---|---|
| B23D 37/00 | (2006.01) |
| B23B 5/18 | (2006.01) |
| B23Q 39/04 | (2006.01) |
| B23B 3/30 | (2006.01) |
| B23B 31/103 | (2006.01) |
| B23B 39/16 | (2006.01) |
| B32B 41/00 | (2006.01) |
| B23D 41/00 | (2006.01) |

(52) U.S. Cl.
CPC ... B23B 5/18 (2013.01); B23B 3/30 (2013.01); B23B 31/103 (2013.01); B23B 39/161 (2013.01); B23Q 39/04 (2013.01); B32B 41/00 (2013.01); *B23B 2215/20* (2013.01); *B23B 2270/54* (2013.01); *Y10T 82/10* (2015.01); *Y10T 82/19* (2015.01)

(58) Field of Classification Search
CPC ............ B23B 39/20; B23B 5/18; B23B 5/28; B23B 3/30; B23B 3/32; B23B 2270/12
See application file for complete search history.

(56) References Cited

U.S. PATENT DOCUMENTS

| 2,138,522 A | * | 11/1938 | Groene et al. ............... 29/38 E |
| 2,174,084 A | * | 9/1939 | Groene ........................ 29/38 E |
| 2,264,458 A | * | 12/1941 | Siekmann ...................... 82/106 |
| 2,280,230 A | * | 4/1942 | Groene ........................ 409/273 |
| 2,291,035 A | * | 7/1942 | Groene .......................... 82/106 |
| 2,299,290 A | * | 10/1942 | Wood ............................. 82/106 |
| 3,621,753 A | * | 11/1971 | Gladoske ......................... 9/235 |
| 3,795,161 A | * | 3/1974 | Berbalk ........................ 82/106 |
| 4,528,876 A | * | 7/1985 | Logue et al. .................... 82/106 |
| 6,233,810 B1 | * | 5/2001 | Asbeck .......................... 29/563 |
| 2014/0345429 A1 | * | 11/2014 | Cano et al. ..................... 82/1.11 |

\* cited by examiner

*Primary Examiner* — Will Fridie, Jr.

(57) ABSTRACT

The machine for machining crankshafts comprises a support (2) to support at least one crankshaft (100), and at least one actuator (1) to actuate a machining tool for machining the crankshaft. The support (2) is configured to hold the crankshaft with at least two clamping devices (21) configured to secure the crankshaft in correspondence with at least two main journals (103) of the crankshaft. The support (2) turns in respect to a vertical axis (A) to modify an angle of attack between a longitudinal axis (B) of the crankshaft (100) and the actuator. The support is provided with a turning mechanism (22) displaceable between a retracted position wherein it does not interact with the crankshaft (100), and an actuation position wherein the turning mechanism (22) interacts with the crankshaft (100) in order to turn the crankshaft (100) in respect to its longitudinal axis (B).

17 Claims, 10 Drawing Sheets

MACHINE FOR MACHINING CRANKSHAFTS

TECHNICAL FIELD

The invention relates to the field of crankshaft manufacturing.

BACKGROUND OF THE INVENTION

In the field of vehicle components it is often sought to reduce the weight of components, for example, in order to reduce fuel consumption. For example, sometimes lightening holes are made in crankshafts. These holes can be made by drilling different areas of the crankshaft.

Figure 1:
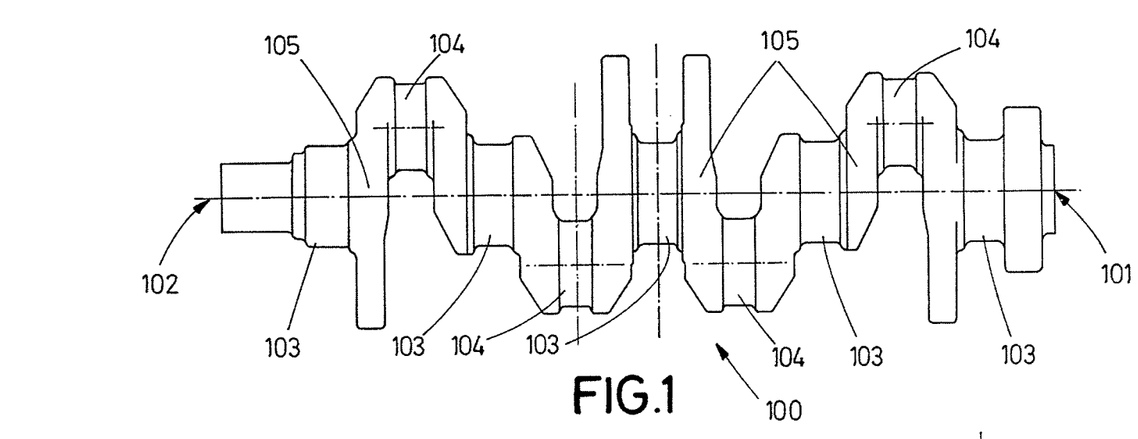
FIG. 1 is schematic view of a typical crankshaft, according to the state of the art.
Figure 2A:
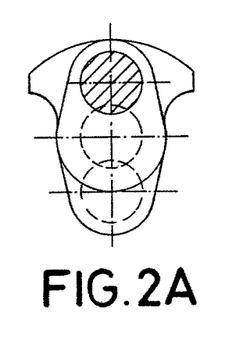
FIGS. 2A-2C illustrate schematically different typical layouts of a crankshaft's crankpin journals.
Figure 2B:
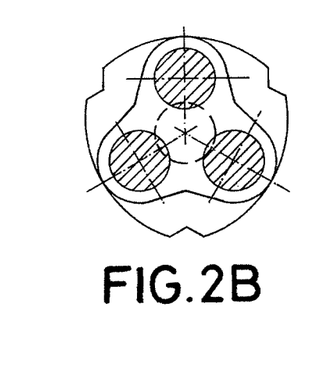
Figure 2C:
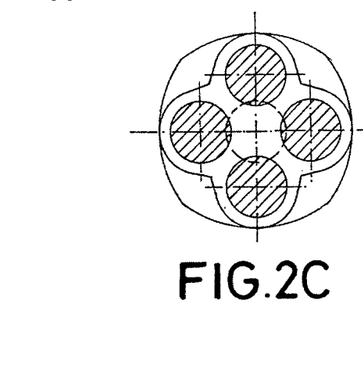

FIG. 1 shows an example of a crankshaft 100, with a flange side 101 and a pulley side 102, with the main journals 103, crankpin journals 104, and counterweights 105. The crankpin journals may be distributed in different ways depending on the type of engine. For example, FIG. 2A shows a 180° layout, FIG. 2B a 120° layout, and FIG. 2C a layout at 90°.

Figure 3:
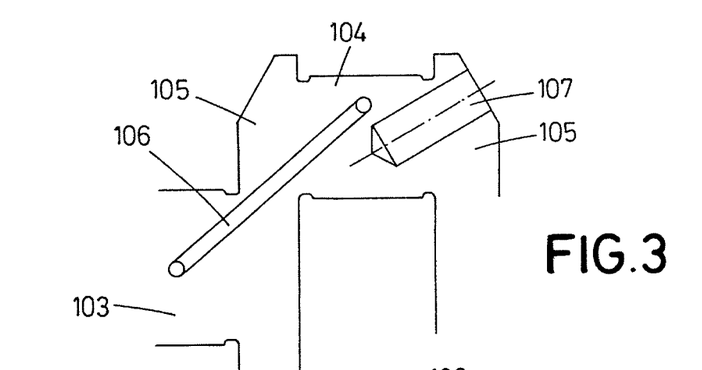
FIG. 3 illustrates schematically the disposition of a lightening hole in a crankshaft.
Figure 4:
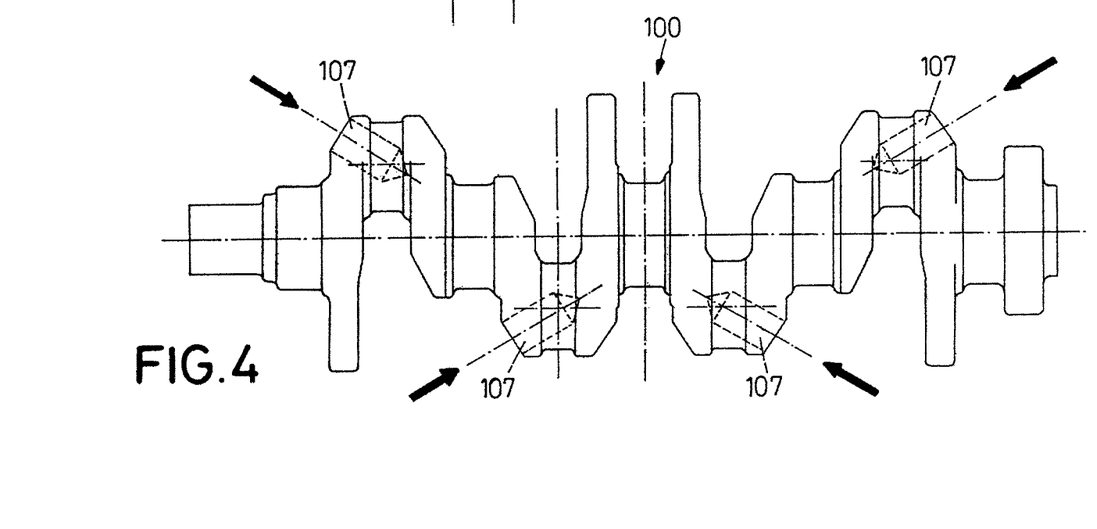
FIG. 4 illustrates schematically the disposition of several lightening holes in a crankshaft.

FIG. 3 schematically illustrates a close-up of one of the lightening holes 107 of the crankshaft, which has been drilled in order to remove internal material from the crank pin 104 and, therefore, in order to reduce the weight of the crankshaft. However, the location and direction of the lightening holes 107 are important given that, for example, they can give rise to a higher risk of fractures, especially in critical points such as in zones close to the lubrication holes 106. As a result, the location and orientation of lightening holes 107 need to be calculated carefully. Consequently, as shown schematically in FIG. 4, a crankshaft may have multiple lightening holes 107, running in different directions. The machining of this type of multiple holes requires machines that allow the elements for machining to be positioned appropriately in respect to the machining tools, and that allow the machining tools to access the zones to be machined without encountering any obstacles. For example, it may be necessary to position the crankshaft in such a way that the direction of the hole to be drilled coincides with the direction of the corresponding machining spindle.

Many kinds of machines for machining crankshafts are known in the art. In these machines, the crankshaft is often held by its ends by devices that are arranged for rotating the crankshaft, cf., for example, U.S. Pat. No. 6,203,478-B1, EP-0397049-A2, and DE-19749939-A1. Although these devices or parts of them are sometimes arranged to allow for a certain axial displacement, basically, in parallel with the longitudinal axis of the crankshaft, as in the case of DE-19749939-A2, the crankshaft remains supported by its ends, and the elements interacting with the ends of the crankshaft can thus render access to certain portions of the crankshaft difficult, especially from certain angles.

DESCRIPTION OF THE INVENTION

A first aspect of the invention relates to a machine for machining crankshafts, for example, for making lightening holes in crankshafts, and/or for other stages of crankshaft machining, such as the machining of the flange and shaft. The machine comprises:

a support to support at least one crankshaft (for example, a support in the shape of a tower or similar);

at least one actuator, for example a spindle, in order to actuate a machining tool for machining the crankshaft (for example, for making lightening holes in the crankshaft; in some embodiments of the invention, the actuator or actuators may be arranged in a type of carriage, displaceable along various axes, as is conventional; in some embodiments of the invention, the actuator may be provided with a tool for drilling lightening holes with diameters of more than 10, 15, 20 or 25 mm);

the support being configured to hold said, at least one, crankshaft with at least two clamping devices configured to secure the crankshaft in correspondence with respective crankshaft main journals. The clamping of the crankshaft by two or more of its main journals provides a firm clamping, which is advantageous since it allows major efforts to be withstood. The lightening holes may have considerable dimensions, for example, diameters of more than 10, 15, 20 or 25 mm, meaning that their drilling could entail high levels of stress. A firm and robust clamping can be essential. The number of clamping devices per crankshaft may depend on the crankshaft dimensions.

The support is turning in respect to a vertical axis in such a way that an angle of attack can be modified between the longitudinal axis of the crankshaft (passing through its main journals) and the actuator and/or the corresponding tool for making lightening holes.

The support is provided with a turning mechanism displaceable between a retracted position in which it does not interact with the crankshaft, and an actuation position wherein the turning mechanism interacts with the crankshaft, for example, with one end of the crankshaft, in order to turn the crankshaft in respect to said longitudinal axis. In this way, the support can be turned in order to modify the angle of attack between the tool and the longitudinal axis of the crankshaft, and to turn the crankshaft about its longitudinal axis, so as to position the hole in the appropriate position, without needing to turn the actuator, which can be displaceable in three orthogonal directions following the X, Y and Z axes, as is conventional in many machine tools. Also, because the turning mechanism is displaceable between its retracted position and its actuation position, the turning mechanism can be retracted so as not to present an obstacle for the tool's access to the crankshaft. Furthermore, given that both ends of the crankshaft can remain freely accessible, it is also possible to machine the flange and shaft of the crankshaft, without the turning mechanism being an impediment for this function.

Sometimes the lightening holes are made on a rough and inclined surface, which may require a prior operation of surface preparation. The machine may be provided with a tool store and an automatic system for changing the tools on the tool actuators, for example, on the spindles, in order to take care of said prior preparation operations and/or the drilling of the holes of different dimensions.

In some embodiments of the invention, the turning mechanism is mounted on the support in such a way that it can be displaced linearly between said retracted position and said actuation position. This allows a very simple configuration, whereby the turning mechanism can be displaced linearly, between the retracted position wherein the end of the crankshaft is left free and does not represent an obstacle for the tool's access to the crankshaft, and the actuation position wherein it acts on the crankshaft, for example, on the end of the crankshaft, to turn it about its longitudinal axis. For example, the turning mechanism may be mounted on the support in such a way that it is displaceable horizontally between said retracted position and said actuation position, which would allow for an especially simple and practical design of the machine. For example, the turning mechanism may comprise a carriage that moves between said positions, guided on the support and driven by, for example, the turning of a spindle or similar.

In some embodiments of the invention, the turning mechanism is mounted on the support in such a way that it is displaceable between said retracted position and said actuation position in a direction perpendicular to a longitudinal axis of the crankshaft. Thus, the turning mechanism can be easily and rapidly withdrawn from the area facing the end of the crankshaft, thereby facilitating accessibility to the crankshaft, including its ends, from different angles.

In some embodiments of the invention, the turning mechanism is mounted on the support in such a way that it is displaceable following a curved trajectory between said retracted position and said actuation position. This may also allow for a simple configuration, whereby the turning mechanism can displace angularly pivoting about an axis, for example, about a horizontal or vertical axis, between the retracted position wherein the end of the crankshaft is left free and does not represent an obstacle for the tool's access to the crankshaft, and the actuation position wherein it acts on the crankshaft, for example, on the end of the crankshaft, in order to turn it.

In some embodiments of the invention, each clamping device comprises a self-centring vice with two jaws configured to displace simultaneously between an open position for loading and/or unloading the crankshaft, and a closed position of fastening the crankshaft. The use of this type of self-centring vice allows easy and correct positioning of the crankshaft in the machine, in such a way that the position of the crankshaft is clearly defined by the clamping devices.

In some embodiments of the invention, the machine comprises at least one angular positioning device, in order to guarantee that the crankshaft is placed correctly with regard to the position of its eccentric parts in respect to the longitudinal axis, in other words, in order to guarantee, for example, that the crankpin journals are correctly positioned. In some embodiments of the invention, each positioning device comprises two positioning members, for example, two claws or jaws, arranged so as to pivot between a first closed position, wherein said positioning members clamp between them a crankpin journal of the crankshaft, and an open position wherein said positioning members allow the crankshaft to turn on its longitudinal axis, without preventing said turning through contact with the crankpin journals. In other words, it is a positioning device with a large opening, wherein the positioning members can be separated or opened so much that they do not prevent the turning of the crankshaft on its longitudinal axis. Given that this is possible due to the pivoting of the positioning members, which may be two claws or jaws, the need to provide the angular positioning device with a retractable movement is avoided; it can simply be opened and closed, something that gives rise to a simpler structure, more economical and with less risk of breakdowns.

In some embodiments of the invention, at least one of said clamping devices is displaceable in a direction parallel to the longitudinal axis of the crankshaft, in such a way that it is possible to adapt the distance between said clamping devices, and/or the position of said clamping devices in respect to the turning mechanism and/or in respect to a reference point on the support, in order to adapt the machine to different types of crankshafts. This makes it possible to increase the machine's flexibility.

In some embodiments of the invention, the support is configured to secure at least two crankshafts, one on top of the other. In this way, with two tool actuators or spindles disposed one on top of the other, it is possible to act simultaneously on the two crankshafts. Thanks to the vertical disposition of the crankshafts, in other words, one on top of the other (instead of one next to the other on the same horizontal plane), a crankshaft does not impede access of one of the tools to the other crankshaft, for example, according to the angle of rotation of the support in respect to the vertical axis. In other words, the tools have the same ease of access to both crankshafts, and it is never easier to access one of the crankshafts over the other. This is an advantage against the frequently used arrangement of the crankshafts next to each other, on the same horizontal plane, wherein one of the crankshafts can block access to the other one. Plus, if the crankshafts are disposed on the same horizontal plane next to each other, upon turning the support of the crankshafts in respect to its vertical axis the distance would vary between the lightening holes for machining, whereupon the lightening holes of the at least two crankshafts could not be machined simultaneously.

In some embodiments of the invention, the support is configured to hold said, at least two, crankshafts, one on top of the other and oriented horizontally, above a space for receiving chips. In other words, instead of having the crankshafts supported on a table, in parallel and on the same horizontal plane, they can be arranged one on top of the other and above a space, such as a pit, for receiving chips. This space may be associated to some type of chips removal system, for example, a conveyor belt or similar in order to prevent the accumulation of chips in one place. The parts that may come into contact with chips may be, for example, made of stainless steel, in order to reduce the risk of the chips adhering to the machinery.

In some embodiments of the invention, the actuator is disposed in order to actuate a machining tool to machine one of said crankshafts, and the machine comprises additionally at least one other actuator disposed to act on a machining tool to machine another of said crankshafts. Both actuators may be axially displaceable independently of each other. In other words, each actuator or spindle can displace axially independently of the other one, which increases flexibility and allows compensation of errors in the positioning of the elements, or errors and tolerances in tool dimensions, etc. Furthermore, it means that one of the crankshafts can be machined differently to the other one, something which may be of interest, for example, in order to provide the two crankshafts with different traceability markings.

In some embodiments of the invention, the machine comprises at least one additional element which is displaceable between an actuation position wherein the additional element interacts with the crankshaft, and a retracted position wherein it does not interact with the crankshaft, the additional element preferably being mounted on the support in such a way that it is displaceable between said retracted position and said actuation position, preferably in a linear manner. This additional element may be any tool or other device designed to interact with the crankshaft at some time in the process (for example, it may be a device for positioning and/or securing the crankshaft), and the fact that it can be retracted serves to facilitate the access of the other tools to the crankshaft, in the same way as retracting the turning mechanism serves this same purpose.

In some embodiments of the invention, the machine comprises an axial positioning system of the crankshaft, which may comprise one or more pushers and/or one or more stoppers or counterpoints, in order to secure the axial position of the crankshaft in respect to a reference point, for example, a stopper. In these embodiments of the invention, the additional element may be an axial positioning element that forms part of an axial positioning mechanism. For example, the additional element may be a stopper against which the crankshaft can stop when it is in an appropriate reference position for machining, or a pusher or other element may displace the crankshaft axially, to a reference position. This axial positioning element (or other type of additional element) may therefore be displaceable between an actuation position wherein the axial positioning element interacts with the crankshaft (for example, facing one end of the crankshaft, for example, the end opposite the end with which the turning mechanisms interacts), and a retracted position wherein it does not interact with the crankshaft.

In some embodiments of the invention, the additional element (for example, an axial positioning element) is mounted on the support in such a way that it is displaceable, for example, linearly or following a curved trajectory, between said retracted position and said actuation position.

In some embodiments of the invention, the additional element is mounted on a side of the support opposite the side of the support on which the turning mechanism is mounted. The turning mechanism may comprise a carriage and the additional element may be mounted on another carriage, and these carriages may be displaceable between the respective retracted and actuation positions, for example, following parallel trajectories. This achieves a compact design whereby the turning mechanism and the additional element (for example, an axial positioning element) can be retracted, independently or in a coordinated fashion, from their respective actuation positions when necessary to allow the machining tools to access the crankshafts from different directions and angles. Logically, in the case of the axial positioning mechanism, this mechanism may include other elements, for example, other pusher and/or stopper elements, which may be mounted on the support itself, and/or on the turning device, for example, in a way that is integrated with the actuator that is used to make the crankshaft turn, or separately from said actuator.

In some embodiments of the invention, the machine additionally comprises a system for loading and unloading crankshafts which includes a manipulator that is provided with, for each crankshaft that the support is configured to hold simultaneously, a first clamping assembly to carry a crankshaft to the support, and a second clamping assembly to remove a crankshaft from the support. In this way, the manipulator which, for example, may be a robot type manipulator or a gantry type manipulator, may approach the support with one, two or more crankshafts to be machined, collect the crankshafts already machined from the support, place the new crankshafts to be machined in the support, and retract with the crankshafts already machined. This allows a reduction in cycle times. The manipulator delivers already machined crankshafts and receives new crankshafts to be machined during the time that the crankshafts supported in the support are being machined, and each time it approaches the support it can collect all the machined crankshafts and load the new crankshafts for machining.

In some embodiments of the invention, each actuator or spindle for a tool is configured to displace in three orthogonal directions, in other words, following the X, Y and Z axes, as is conventional.

In some embodiments of the invention, the crankshafts are clamped in the support with their longitudinal axis disposed horizontally.

In some embodiments of the invention, the turning mechanism is mounted on a side of the support, in such a way that it can be displaced in order to interact with one end of the crankshaft in said actuation position, to turn the crankshaft about its longitudinal axis. This configuration is very simple and practical.

Another aspect of the invention relates to a method for machining a crankshaft, which comprises the step of disposing the crankshaft in the support of a machine according to any of the embodiments above, and orienting the crankshaft in respect to a machining spindle turning the support following a vertical axis, and turning the crankshaft about its longitudinal axis. The method may additionally comprise the step of making at least one lightening hole in the crankshaft.

BRIEF DESCRIPTION OF THE DRAWINGS

In order to complement the description and with a view to contributing towards a better understanding of the characteristics of the invention, in accordance with an example of a practical embodiment thereof, a set of drawings is attached, as an integral part of the description, which by way of illustration and not limitation, represent the following.

DESCRIPTION OF MODES OF EMBODIMENT OF THE INVENTION

Figure 5:
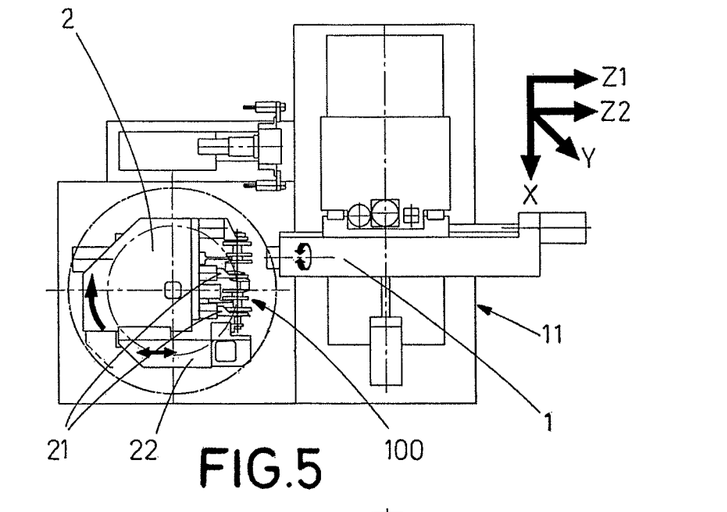
FIG. 5 is a schematic plan view of a machine according to a possible embodiment of the invention.
Figure 6:
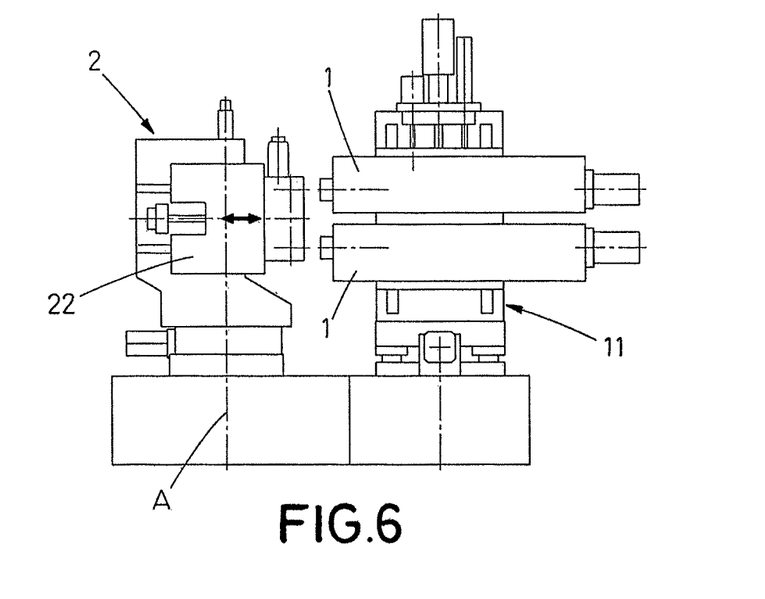
FIG. 6 is a side view of said machine.
Figure 7:
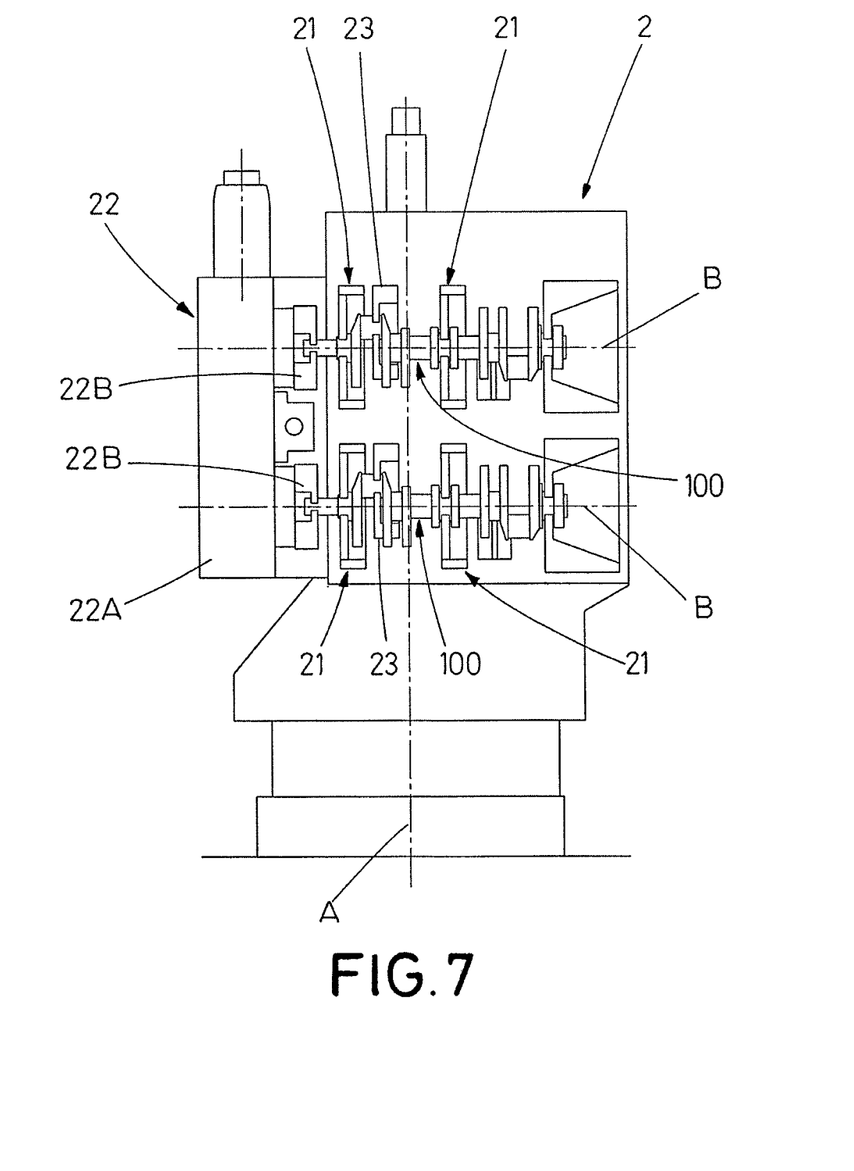
FIG. 7 is a front view of the support of said machine.
Figure 8:
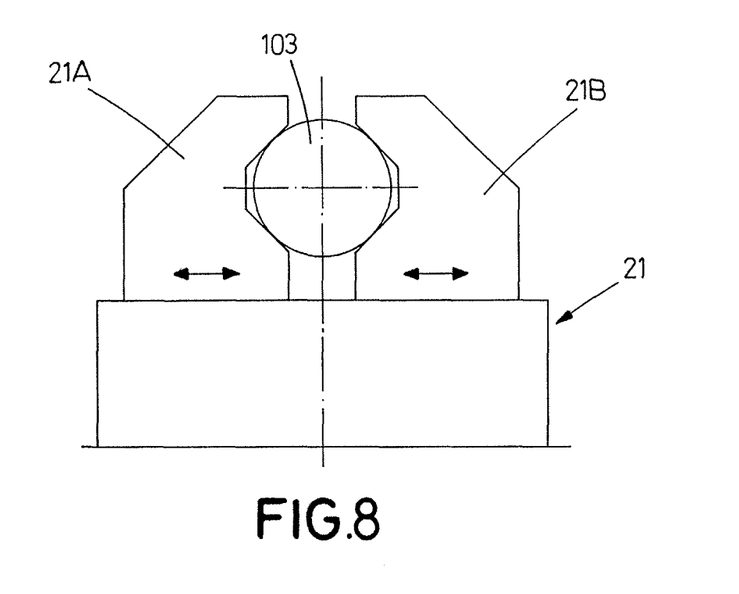
FIG. 8 illustrates schematically an example of the embodiment of a clamping device of said machine.

FIGS. 5-7 reflect schematically how a machine according to a possible embodiment of the invention comprises a support 2 in the shape of a tower which can turn or pivot in respect to a vertical axis A. As may be seen in FIG. 7, the support comprises two pairs of clamping devices 21 in order to secure respective crankshafts 100 holding them by two of their main journals (depending on the type of crankshaft, the crankshafts may be held by more main journals, for example, by three or more main journals). In other words, the clamping devices are disposed in two rows, one on top of the other, to clamp respective crankshafts 100, one on top of the other, with the longitudinal axis B of each crankshaft disposed horizontally. Each clamping device 21 may have two jaws 21A and 21B which can displace simultaneously between an open position for loading and/or unloading the crankshaft, and a closed position clamping the crankshaft, as illustrated schematically in FIG. 8. The jaws may have a self-centring configuration with inclined or curved surfaces so that when the jaws close, the crankshaft is disposed with its longitudinal axis B in a well-defined position.

At the same time, as may be observed in FIGS. 5 and 6, the machine comprises a frame 11 on which two spindles 1 are disposed to actuate respective tools, for example tools for drilling lightening holes. These spindles are displaceable following two horizontal perpendicular axes and following one vertical axis, in other words, following the four axes, X, Y and Z1/Z2, in other words, each spindle 1 can displace axially independently of the other one, which increases flexibility and allows for compensation for errors in the positioning of the elements, due to errors and tolerances in tool dimensions, etc. Also, it makes it possible to machine the crankshafts in different ways from each other, something that may be of interest, for example, for providing the two crankshafts with different traceability markings. In this way, the positioning between the crankshafts 100 and the spindles 1 may vary according to five degrees of freedom, namely, three degrees of freedom corresponding to the linear displacement of the spindles following four axes X, Y and Z1/Z2, and two degrees of freedom corresponding to the turning of the support following the vertical axis A, and the turning of the crankshaft on its longitudinal axis B.

In order to make the crankshaft turn on its longitudinal axis B, the machine comprises a turning mechanism 22 which is mounted on a side of the support, in such a way that it can be displaced, following the arrow illustrated in FIGS. 5 and 6, between a retracted position wherein it does not interact with the crankshaft 100, and an actuation position wherein the turning mechanism 22 interacts with the crankshaft 100 in order to turn the crankshaft 100 in respect to said longitudinal axis B. As may be observed in FIGS. 7 and 10, the turning mechanism comprises on the one part a carriage 22A that can displace horizontally driven by actuator means and guided by a system of guides which have not been illustrated in detail, and on the other part an actuator 22B that can connect with the end of the crankshaft to turn it, in a controlled manner.

Figure 9:
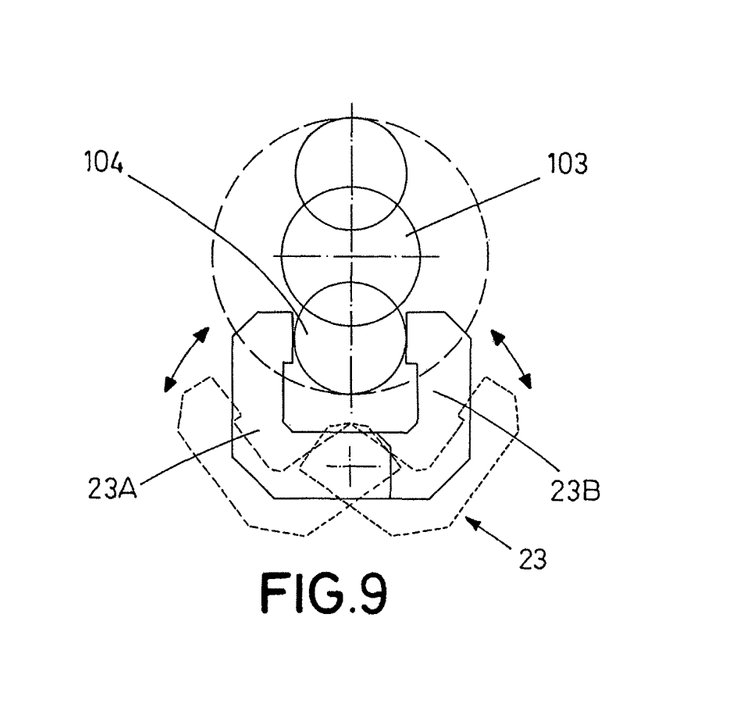
FIG. 9 illustrates schematically a part of a positioning device of said machine.
Figure 10:
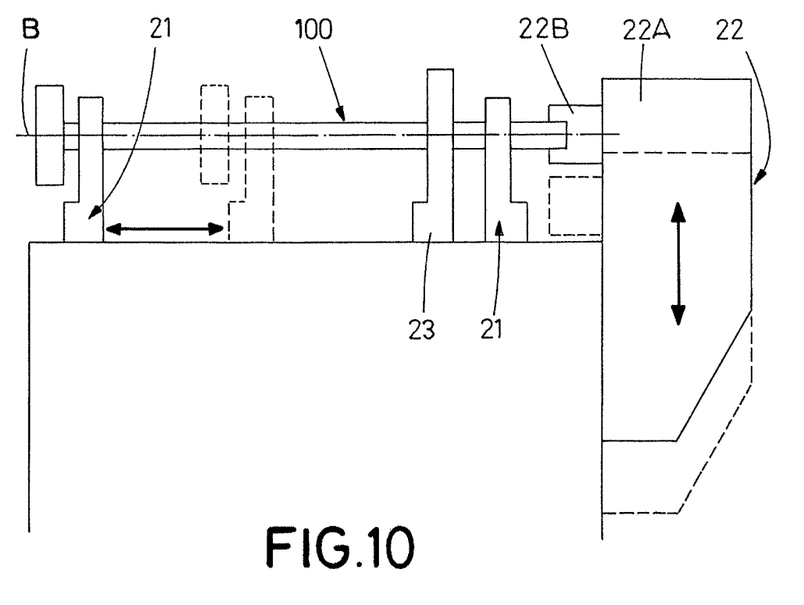
FIG. 10 illustrates schematically how the distance between the clamping devices can be changed.

In order to guarantee a correct positioning of the crankshaft in terms of its angular position in respect to the longitudinal axis B, the machine comprises, in correspondence with each crankshaft and as may be observed in FIGS. 7, 9 and 10, an angular positioning device 23 which comprises two positioning members 23A and 23B disposed to pivot between a first closed position, wherein said positioning members 23A and 23B grip between them a crankpin journal 104 of the crankshaft as may be observed in FIG. 9, and an open position wherein said positioning members 23A and 23B allow the turning of the crankshaft about its longitudinal axis without preventing said turning through contact with the crankpin journals, as indicated by the dashed lines in FIG. 9. In other words, it is a positioning device with a large opening, wherein the positioning members can be separated or opened so much that they do not prevent the turning of the crankshaft. This avoids the need to provide the positioning device 23 with a movement of retraction; it can simply open and close.

Figure 14A:
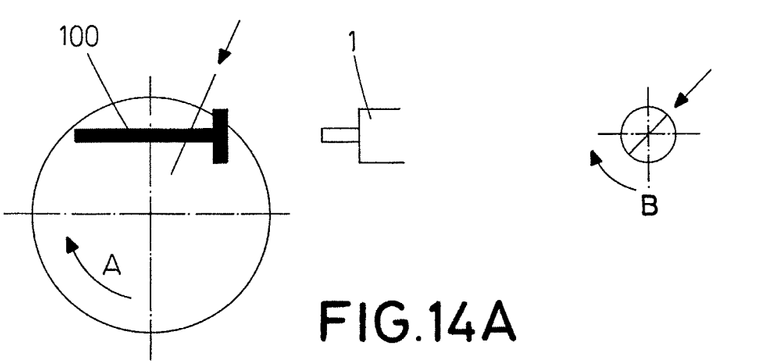
FIGS. 14A-14C reflect schematically how a crankshaft may be oriented in respect to the machining spindle.
Figure 14B:
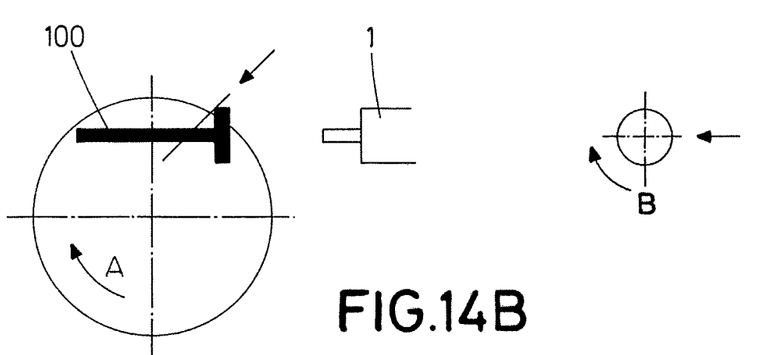
Figure 14C:
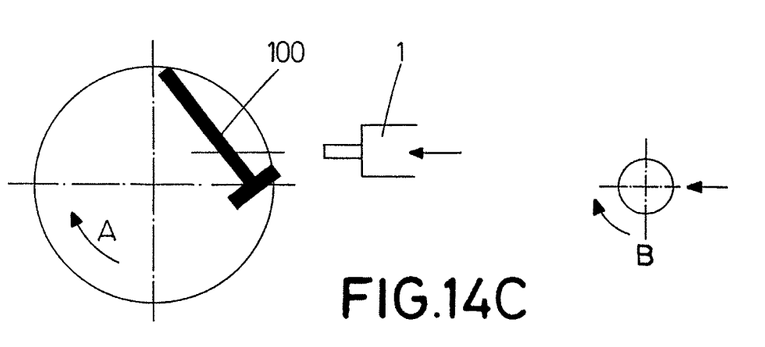

With this machine and with the spindles 1 displaceable linearly following three orthogonal axes, it is possible to position the crankshaft correctly in respect to the spindle in order to make a lightening hole, as illustrated in FIGS. 14A-14C. In the figures, the straight arrows illustrate the desired direction of the hole to be drilled. To orient the crankshaft correctly in respect to the spindle 1 and the corresponding tool, the crankshaft is turned on its longitudinal axis B (the step from FIG. 14A to FIG. 14B) and the support is turned on its vertical axis A (step from FIG. 14B to FIG. 14C). Logically, these two steps can be carried out in any order, simultaneously or one after the other.

FIG. 10 illustrates schematically how one of the clamping devices 22 is displaceable in parallel with the longitudinal axis of the crankshaft, in other words, horizontally, to allow the machine to be adapted easily to a different type of crankshaft (illustrated with a dashed line, like the new position of the clamping device). In some embodiments of the invention, more than one of the clamping devices is displaceable in this way.

Figure 11:
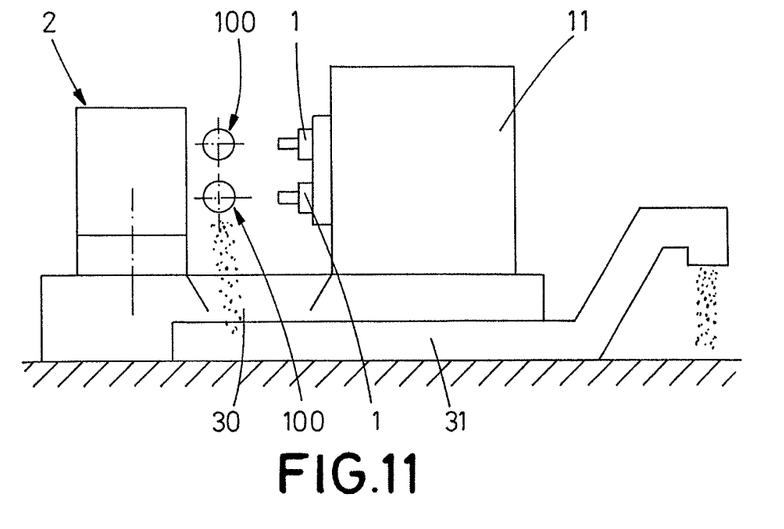
FIG. 11 illustrates schematically how chips are collected, in a possible embodiment of the invention.

FIG. 11 illustrates how, in accordance with a possible embodiment of the invention, the two crankshafts 100 can be disposed one on top of the other, each with its longitudinal axis oriented horizontally, on one side of the support 2, in such a way that the chips which are generated during machining fall to a pit 30 for collecting chips, from where they can be conveyed through a chips removal system 31 to prevent an excessive accumulation of the chips.

Figure 12:
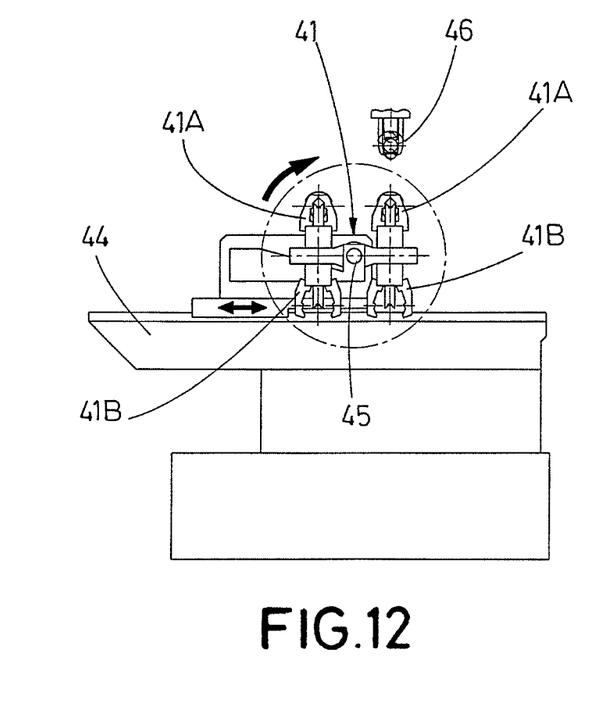
FIGS. 12 and 13 illustrate schematically two possible embodiments of a manipulator for loading and unloading crankshafts on the support.
Figure 13:
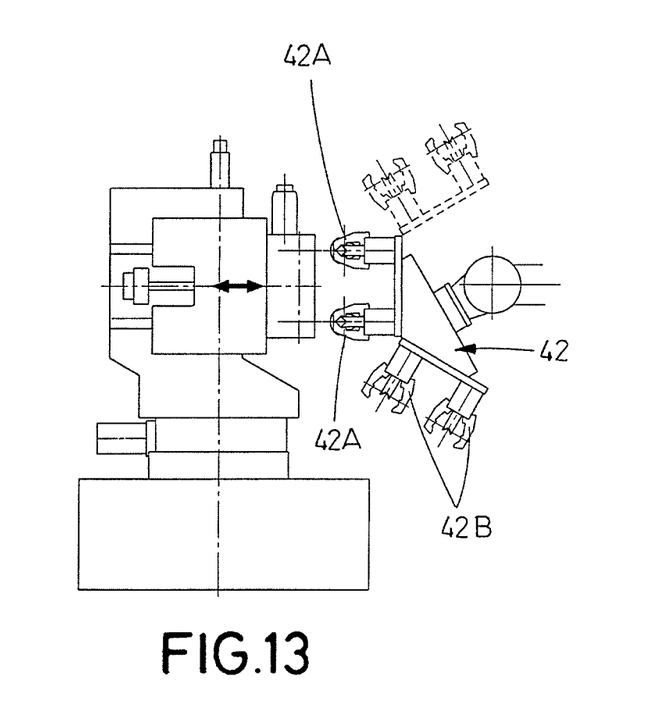

FIGS. 12 and 13 illustrate, schematically, how the machine can comprise a system for loading and unloading crankshafts which includes a manipulator 41, 42 that is provided with, for each crankshaft that the support is configured to hold simultaneously, a first clamping assembly 41A, 42A to carry a crankshaft to the support 2, and a second clamping assembly 41B, 42B to remove a crankshaft from the support. In the case of FIG. 12, the manipulator is displaceable linearly across the length of a frame 44 and can pivot following a horizontal axis 45, in such a way that it can receive two crankshafts from above as illustrated in FIG. 12, which are clamped by the jaws of the first clamping assembly 41A. Subsequently, the manipulator turns 90 degrees in a clockwise direction, following the horizontal axis 45, and displaces linearly towards the support 2. Once there, the jaws of the second clamping assembly 41B collect the crankshafts that are in the support, already machined. Next, the manipulator 41 turns 180 degrees on the horizontal axis 45 to place the first clamping assembly 41A opposite the support, in order to load the new crankshafts to be machined in the support. Then, the manipulator retracts to unload the machined crankshafts and to receive new crankshafts for machining, it being possible to carry out this loading and unloading operation at the same time as the crankshafts mounted on the support are machined.

FIG. 13 illustrates an alternative wherein instead of a manipulator mounted on a frame such as the one illustrated in FIG. 12, the manipulator 42 is mounted on a robotic arm.

Figure 15:
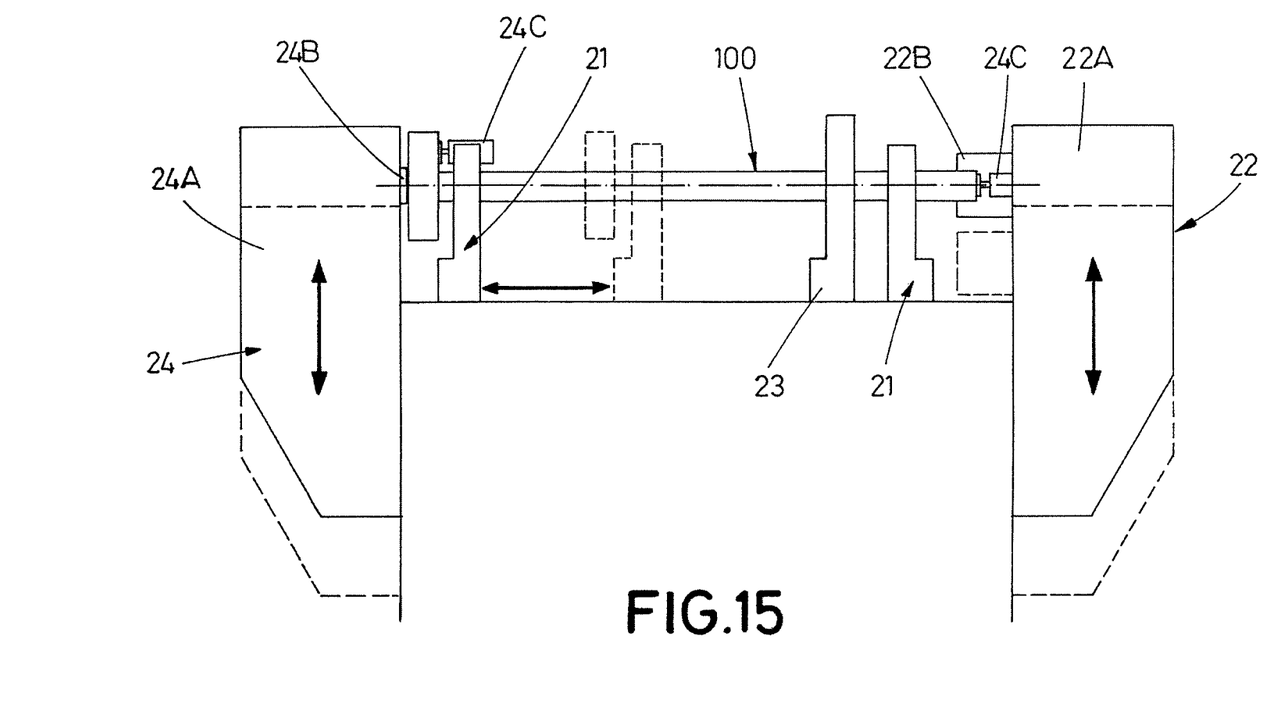
FIGS. 15-16 are schematic views of the support according to an alternative embodiment of the invention.
Figure 16:
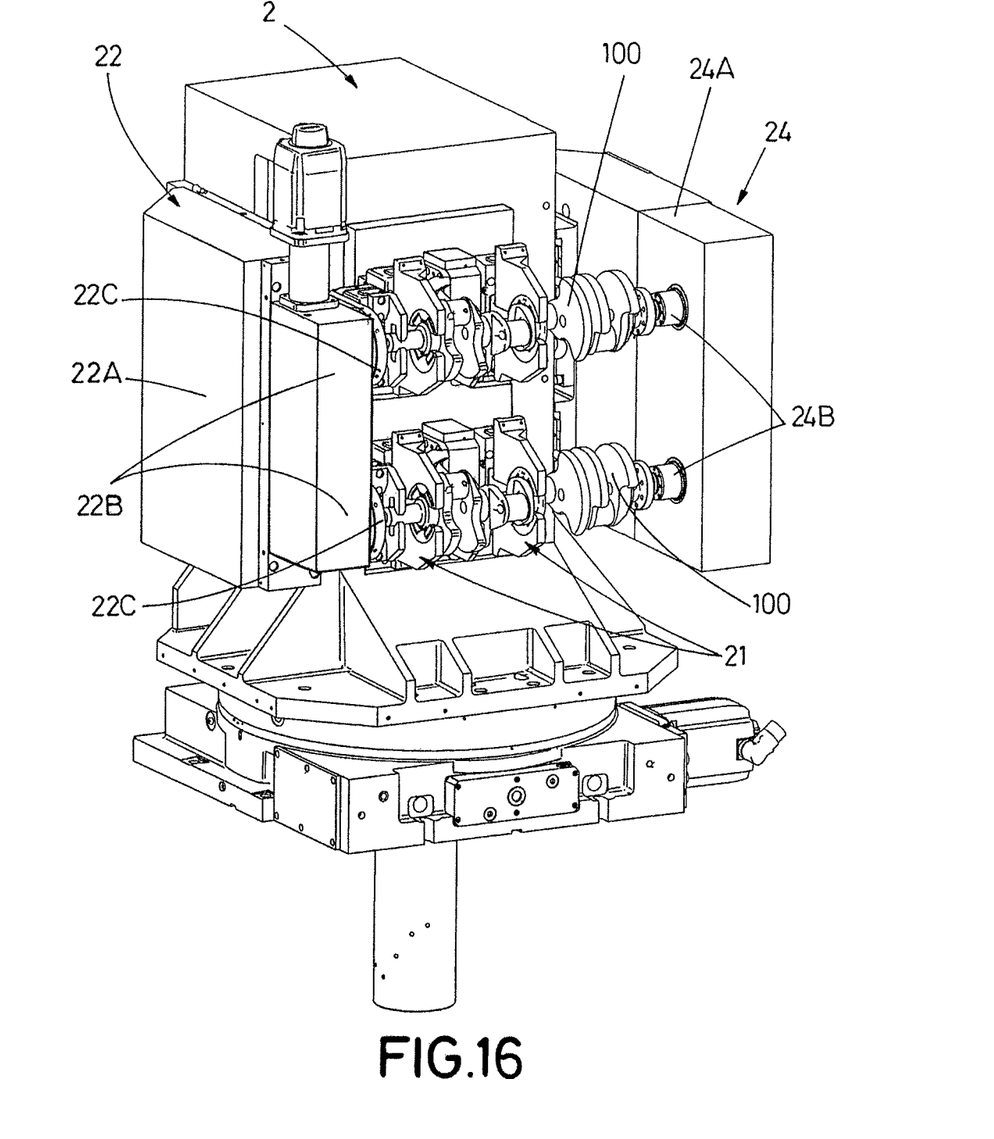

FIGS. 15 and 16 illustrate an alternative embodiment, wherein in addition to the carriage 22A there is a second carriage 24A, mounted on the side of the support 2 opposite the side on which carriage 22A is mounted. In the second carriage 24A an axial positioning element 24B is mounted (in other embodiments of the invention it may be another type of device, for example, a tool or similar, or a device for positioning and/or securing the part to be machined) which serves to position the crankshaft correctly in its axial direction, or any other device that it may be necessary to retract so as not to interfere with the machining. This axial positioning element 24B may be a stopper or counterpoint, against which the crankshaft can be pushed by means of the use of one or more pushers 24C, which may be mounted on the support itself or similar, and/or in the carriage 22A of the turning mechanism, as illustrated schematically in FIG. 15. Alternatively, the axial positioning element 24B may be a pusher or similar. The carriages 22A and 24A are both displaceable linearly between their respective actuation positions (wherein the actuator 22B and the axial positioning element 24B interact with the crankshaft to turn it and to act as a stopper, respectively) and their respective retracted positions, wherein they do not prevent access of the tools of the actuators 1 to the crankshaft, from different positions and angles. In FIG. 16 it is also possible to observe schematically the jaws 22C that form part of the turning mechanism 22.

In this text, the word "comprises" and its variants (such as "comprising", etc.) must not be interpreted as being excluding, in other words, they do not exclude the possibility of what is described including other elements, steps, etc.

At the same time, the invention is not limited to the specific embodiments described but also encompasses, for example, variants that may be embodied by the average person skilled in the art (for example, in terms of the choice of materials, dimensions, components, configuration, etc.), within the scope of what can be inferred from the claims.

The invention claimed is:

1. Machine for machining crankshafts, which comprises:
a support (2) with a vertical axis (A) perpendicular to a base to support at least one crankshaft (100);
at least one actuator (1) to actuate a machining tool to machine the crankshaft;
the support (2) being configured to hold the at least one crankshaft having a longitudinal axis (B) arranged horizontally to the vertical axis (A) using at least two clamping devices (21) configured to secure the crankshaft in correspondence with at least two main journals (103) of the crankshaft the support (2) being turnable in respect to the vertical axis (A) in order to modify an angle of attack between a longitudinal axis (B) of the crankshaft (100) and the actuator (1), the support (2) provided with a turning mechanism (22) displaceable between a retracted position wherein it does not interact with the crankshaft (100), and an actuation position wherein the turning mechanism (22) interacts with the crankshaft (100) in order to turn the crankshaft (100) in respect to the longitudinal axis (B).

2. Machine according to claim 1, wherein the turning mechanism (22) is mounted on the support (2) in such a way that it is linearly displaceable between said retracted position and said actuation position.

3. Machine according to claim 2, wherein said turning mechanism (22) is mounted on the support (2) in such a way that it is displaceable horizontally between said retracted position and said actuation position.

4. Machine according to claim 1, wherein the turning mechanism (22) is mounted on the support (2) in such a way that it is displaceable following a curved trajectory between said retracted position and said actuation position.

5. Machine according to claim 1, wherein each clamping device (21) comprises a self-centering vice with two jaws (21A, 21B) configured to be displaced simultaneously between an open position for loading and/or unloading the crankshaft, and a closed position clamping the crankshaft.

6. Machine according to claim 1, which additionally comprises at least one angular positioning device (23) which comprises two positioning members (23A, 23B) disposed to pivot between a first closed position, wherein said positioning members (23A, 23B) grip between them a crankpin journal (104) of the crankshaft, and an open position wherein said positioning members (23A, 23B) allow the crankshaft to turn about its longitudinal axis.

7. Machine according to claim 1, wherein at least one of said clamping devices (21) is displaceable in a direction parallel to the longitudinal axis (B) of the crankshaft, in such a way that it is possible to adjust the distance between said clamping devices (21) to adapt the machine to different types of crankshafts.

8. Machine according to claim 1, wherein the support (2) is configured to clamp at least two crankshafts, one on top of the other, preferably oriented horizontally, preferably over a space (30) for receiving chips.

9. Machine according to claim 8, wherein said actuator (1) is disposed to actuate a machining tool to machine one of said crankshafts (100), the machine additionally comprising at least one other actuator (1) disposed to actuate a machining tool to machine the other of said crankshafts (100), both actuators being axially displaceable (Z1/Z2) independently of each other.

10. Machine according to claim 1, which comprises at least one additional element (24B) which is displaceable between an actuation position wherein the additional element (24B) interacts with the crankshaft, and a retracted position wherein it does not interact with the crankshaft, the additional element (24B) being preferably mounted on the support (2) in such a way that it is displaceable between said retracted position and said actuation position, preferably in a linear manner.

11. Machine according to claim 10, which comprises an axial positioning mechanism (24) of the crankshaft, said at least one additional element (24B) being an axial positioning element (24B) which forms part of said axial positioning mechanism (24).

12. Machine according to claim 10, wherein the additional element (24B) is mounted on a first side of the support (2) and wherein the turning mechanism (22) is mounted on a second side of the support (2) opposite to said first side, the turning mechanism preferably comprising a carriage (22A) and the additional element (24B) being preferably mounted on another carriage (24A), said carriages being displaceable between respective retraction and actuation positions, preferably following parallel trajectories.

13. Machine according to claim 1, which additionally comprises a system for loading and unloading crankshafts which includes a manipulator (41, 42) which is provided with, for each crankshaft that the support is designed to hold simultaneously, a first clamping assembly (41A, 42A) to carry a crankshaft to the support (2), and a second clamping assembly (41B, 42B) to remove a crankshaft from the support (2).

14. Machine according to claim 1, wherein the turning mechanism (22) is mounted on a side of the support (2), in such a way that it can be displaced in order to interact with one end of the crankshaft (100) in said actuation position, to turn the crankshaft about its longitudinal axis (B).

15. Method for making lightening holes in a crankshaft comprising the steps:
placing the crankshaft in the support (2) of a machine according to claim 1;
orienting the crankshaft in respect to a machining spindle;
turning the support (2) following a vertical axis (A);
turning the crankshaft following its longitudinal axis (B); and
making at least one lightening hole in the crankshaft.

16. Machine according to claim 1, wherein said turning mechanism (22) is mounted on the support (2) in such a way that it is displaceable between said retracted position and said actuation position in a direction perpendicular to a longitudinal axis of the crankshaft.

17. Machine according to claim 1, wherein said turning mechanism (22) is arranged so that when it is in said retracted position, the corresponding end of the crankshaft is freely accessible to the machining tool.

* * * * *